United States Patent [19]

Wang

[11] Patent Number: 4,645,371

[45] Date of Patent: Feb. 24, 1987

[54] SAFETY JOINT MECHANISM, PARTICULARLY FOR FOLDING LADDERS

[76] Inventor: Chien-Yuan Wang, No. 25 Nanking East Road, Sec. 4, Taipei, Taiwan

[21] Appl. No.: 857,972

[22] Filed: May 1, 1986

[51] Int. Cl.⁴ .......................... F16C 11/00; E06C 7/50
[52] U.S. Cl. ........................................ 403/93; 403/96; 182/163; 16/332
[58] Field of Search ............................ 403/93, 96, 99; 182/163, 164; 16/332, 334, 349, 325, 324, 344

[56] References Cited

U.S. PATENT DOCUMENTS

| | | | |
|---|---|---|---|
| 3,643,292 | 2/1972 | Mayer | 16/325 |
| 3,955,240 | 5/1976 | Schuh et al. | 403/93 X |
| 4,474,264 | 10/1984 | Krause | 16/332 X |
| 4,540,306 | 9/1985 | Wang | 403/93 |
| 4,543,006 | 9/1985 | Wang | 403/93 |
| 4,577,986 | 3/1986 | Wang | 403/93 |

FOREIGN PATENT DOCUMENTS 2052584  5/1972  Fed. Rep. of Germany ...... 182/163

Primary Examiner—Andrew V. Kundrat
Attorney, Agent, or Firm—Burns, Doane, Swecker & Mathis

[57] ABSTRACT

Improvements in a joint mechanism in which a resilient leaf spring is mounted at its tail end on a first joint member at a location adjacent one side of a locking piece engageable in notches formed in the circumferential edge of a hollow locking disk of a second joint member and its free front end being provided with a bent portion good enough to retain the front end of the locking piece. While the locking piece is being lifted up from the associated notch upon operation of an operating lever provided on the first joint member, the bent portion at the front end of the resilient leaf spring automatically swiftly moves under its own elasticity into the front end of the locking piece to lock it from engaging again in the notch thereby permitting a change in the angular position of the joint to be made. In order to attain the locking/releasing purposes in the locking piece, only when the two joint members pivotably connected together are folded in an opposite direction relative to one another, wherein one edge of the notch will push the blocking bent portion of the resilient leaf spring away from the front end of the locking piece, will the locking piece be able to fall into the notch.

3 Claims, 6 Drawing Figures

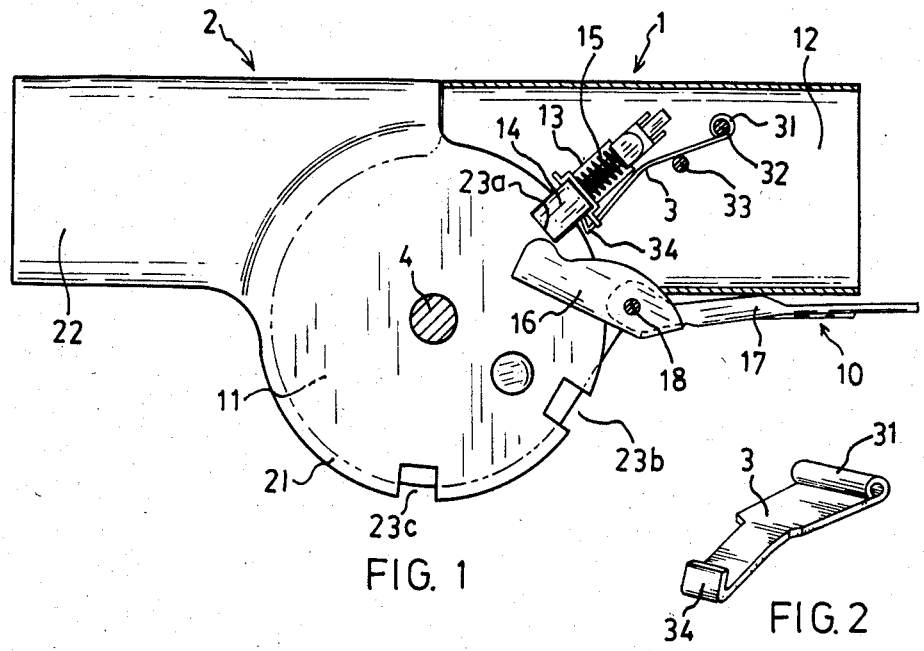
FIG. 1
FIG. 2
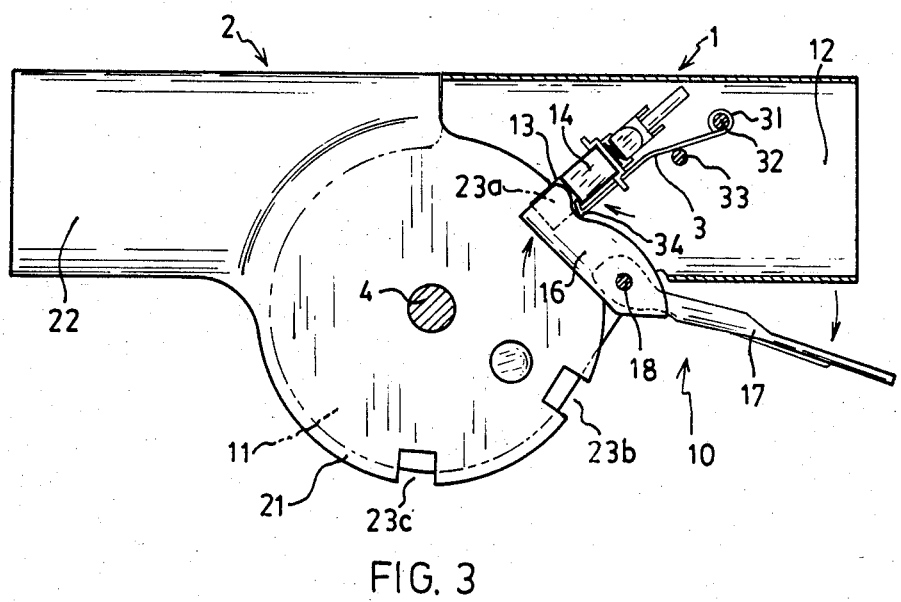
FIG. 3

SAFETY JOINT MECHANISM, PARTICULARLY FOR FOLDING LADDERS

Reference is given here to the applicant's U.S. Pat. Nos. 4,540,306, 4,543,006 and 4,577,986.

DETAILED DESCRIPTION

The present invention relates to multiposition lock joints, and more particularly to an improved safety joint mechanism for use in folding ladder sections, or to connect other elongated sections which allows the sections to be freely folded or unfolded, positionally adjusted and locked in at least one pre-determined angular position.

Conventionally, a joint connecting two ladder sections, for example, in German Pat. No. 2,052,584 to Hoffman, comprises a first joint member connected to either of the said two ladder sections and having a disk portion composed of two spaced-apart, symmetrically arranged circular plates, and further comprising a second joint member which is rigidly connected to the other one of the said two ladder sections and having a hollow flat locking disk formed of a pair of circular shell halves enclosing a sector-shaped ratchet, with open notches provided preferably at equal distances about its periphery and further connected with the disk portion of the said first joint member so as to be pivotable about a joint pin, a spring-biased locking element being provided and guided on the said first joint member which snugly fits into the different individual open notches, respectively, when the said ladder sections are in any of the pre-determined positions and which is released from its engaged position and secured in its disengaged or unlocked position by an operating lever which is pivoted on the said first joint member and by the said ratchet provided in the second joint member.

However, since the said ratchet is formed with peripheral teeth with each one of the teeth projecting outwardly of the joint through notch, these outwardly projecting teeth tend to cause injuries to the user, or to become caught on clothing. In addition, such teeth may result in malfunction of the joint due to its susceptibility to damage while encountering impacts or external forces. Moreover, owing to the construction of the second joint member in two symmetrically superposed shell halves of sheet metal, it will be rather cumbersome to assemble the ratchet and the spring for biasing the former within the locking disk during the manufacturing process.

Accordingly, the present invention overcomes the aforesaid disadvantages by providing a still improved and novel joint mechanism which ensures safety in use while being easy to operate.

An object of the invention is to provide a joint with the mechanism which will not only eliminate the defects associated with a joint with conventional sector-shaped ratchet, but also improve in the construction of the joint over the applicant's previous three types of the ladder joint.

A further object of the invention is to provide a safety joint mechanism for positioning in a folding ladder in which a resilient leaf spring situated adjacent one side of the locking element having the forward end thereof carrying a lug and the rear end fixedly secured within the tubular portion of one joint member is provided for use in retaining or releasing the locking element to allow the latter to be engaged or not in an open notch.

A still further object of the invention is to provide a positioning means in which least possible parts are employed to achieve the function of retaining or releasing the locking element in the positioning joint of a folding ladder so as to lower the cost and simplify the production of the joints.

The invention will be described by way of example with reference to the accompanying drawings, wherein:

FIG. 1 is a partial sectional view of a joint mechanism for folding ladder according to the invention;

FIG. 2 is a perspective view of a resilient leaf spring;

FIG. 3 is a schematic view 1 of operating the joint in accordance with the invention;

Figure 4:
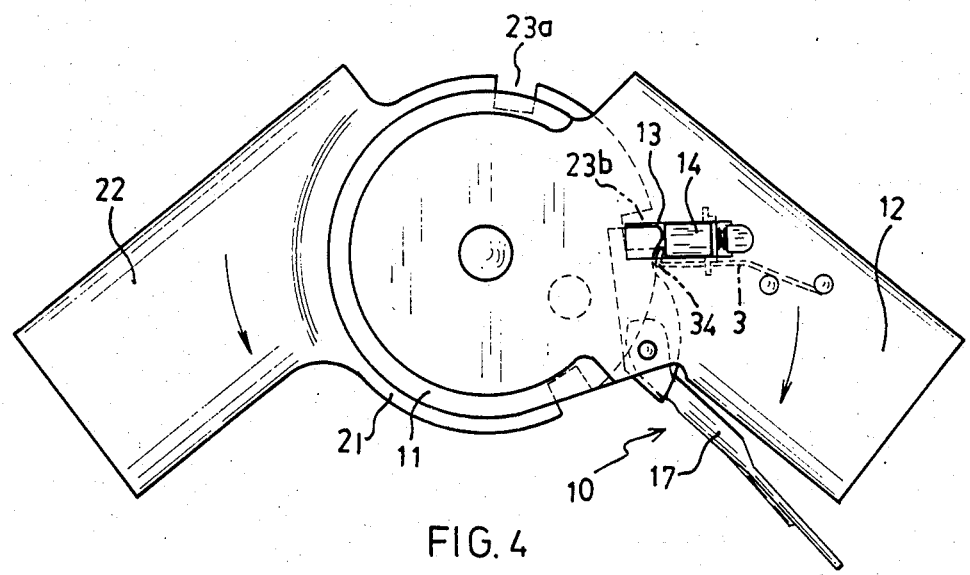
FIG. 4 is a schematic view 2 of operating the joint in accordance with the invention.

The joint mechanism according to the present invention comprises, as shown in FIG. 1, a first joint member and a second joint emmber. The construction of the joint member 1 is generally similar to a conventional one, i.e., it may be formed, for example, of sheet metal pressed into a disk portion 11 having a pair of spaced-apart, symmetrically disposed circular plates and a tubular portion 12. The tubular portion 12 is provided with two rectangular slots 13, one on each side thereof, and an oblong-shaped pawl 14 slidably supported at both ends in the slots 13 and spring biased towards the disk portion 11 by a spring 15 (the foregoing is similar to the conventional one). A manually-operated operating lever 10, as described in applicant's U.S. Pat. No. 4,577,986, is composed of a forked release element 16 and a handle 17, and is pivotably connected to the disk portion 11 by a pivot pin 18 at a point close to the tubular portion 12.

The second joint member 2, formed similarly in a conventional manner of sheet metal by pressing, comprises a hollow, flat locking disk 21 formed of a pair of circular shell halves and an integrally formed flat tubular portion 22. The locking disk 21 is provided with circumferentially distributed notches 23 in its closed peripheral edge (likewise, the foregoing is similar to the conventional one). However, whether inside the hollow locking disk 21 or within the space between the outer side thereof and the opposite side of the disk portion 11 of the first joint member there is absence of any mechanism whatsoever of a conventional type except the two joint member 1, 2 are pivotably connected together by a joint pin 4.

As depicted in FIGS. 1 and 2, there is illustrated a resilient leaf spring 3 in which the tail end 31 is rolled up in the form of a cylinder and the front end is provided with a bent poriton 34 in the form of a lug. This resilient leaf spring 3 is mounted on the tubular portion 12 of the first joint member 1 at a location between the slots 13 and the handle 17 by means of a rivet passing through the tail end 31. The bent portion 34 is directed towards the pawl 14 and on its outer side a retaining pin 33 mounted on the tubular portion 12 presses the free end of the resilient leaf spring 3 towards the slots 13 urging the bent portion 34 to lie closely against the side face of the pawl 14.

Returning again to FIG. 1, there is illustrated the tubular portions 12, 22 respectively of the members 1, 2 being in alignment relative to one another, with the pawl 14 snugly fitting in the notch 23a and while the front end of the forked release element 16 is being urged by the resilient force of the pawl 14 in a counterclockwise direction, the handle 17 is thereby caused to lie against the underside of the tubular portion 12.

Figure 5:
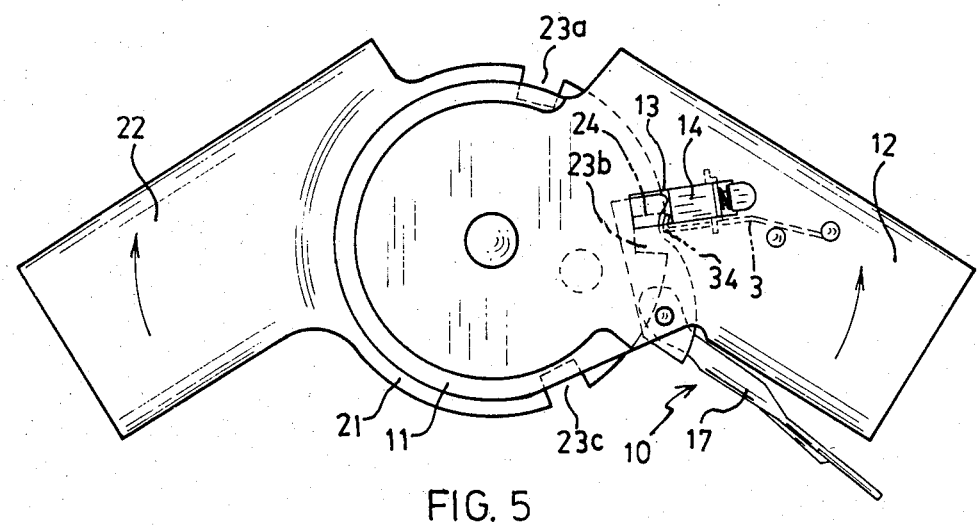
FIG. 5 is a schematic view 3 of operating the joint in accordance with the invention.
Figure 6:
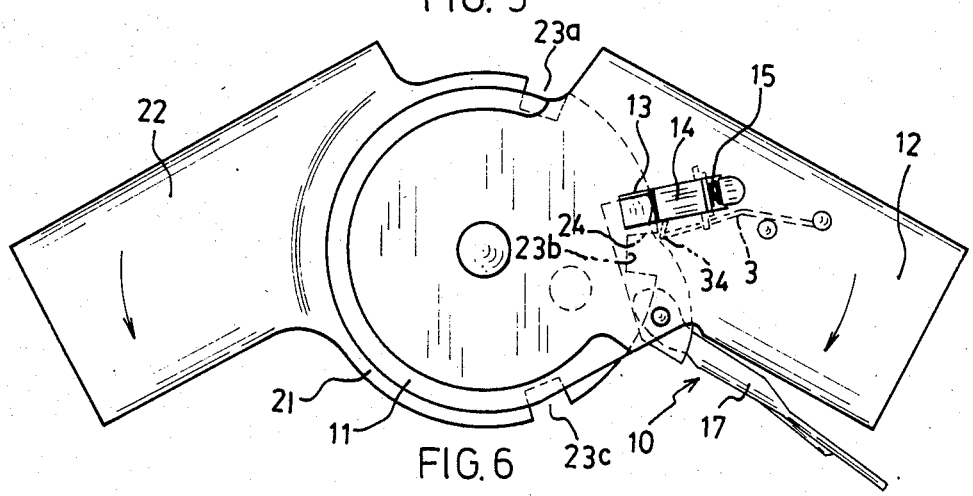
FIG. 6 is a schematic view 4 of operating the joint in accordance with the invention.

When it is desired to change the angular position of the two joint members relative to one another, the handle 17 is first swung in a direction as indicated by an arrow in FIG. 3, this will turn the forked release element 16 at the other end of the operating lever 10 in a clockwise direction about the pivot pin 18 which will, in turn, push the pawl 14 outwardly away from the notch 23a. Upon the upward movement of the pawl 14 till its terminal face has reached beyond the bent portion 34 of the resilient leaf spring 3 situated at the side face thereof, the bent portion 34 will by its own elasticity immediately spring forward on to the terminal face of the pawl 14, thereby retaining and preventing the pawl 14 from falling into the notch 23a again. Thereupon, the joint members 1, 2 of the joint mechanism according to the present invention can be folded with respect to each other in a manner as indicated by arrows in FIG. 4. During this movement, the pawl 14 which is being spaced apart by the bent portion 34 at the front end of the resilient leaf spring 3 will slide along the peripheral edge of the disk 21 of the first joint member 1. When the pawl 14 passes over the notch 23b, since blocking at its front there being the bent portion 34 now, the pawl 14 will not possibly be engaged in the notch 23b. Hence, to enable the pawl 14 to be engageable within the notch 23b, the pawl must first be moved to pass over the notch 23b and then the two joint members 1, 2 are pivoted with respect to one another in an opposite direction as indicated by arrows in FIG. 5. As the pawl 14 passes over the notch 23b, the edge 24 of the notch 23b will block the bent portion 34 of the resilient leaf spring 3 from passing through. In this way, when the pawl 14 has completely passed over the notch 23b, so has the bent portion 34 been poked away into the lateral side of the pawl 14 and immediately, the terminal face of the pawl 14 comes into direct contact with the peripheral edge of the locking disk 21. At this moment, as the bent portion 34 of the resilient leaf spring 3 can no longer hold back the terminal face of the pawl 14, the two joint members 1, 2 can then be folded with respect to each other in a direction as indicated by arrows in FIG. 6. While on passing over the notch 23b, the pawl 14 urged by the spring 15 will immediately fall into the notch 23b, thereby securing effectively another angular position.

It can be appreciated from the foregoing that at each of the angular positions of the joint mechanism of the present invention, upon the swinging of the operating handle 17 the forked release element 16 will disengage the pawl 14 from its associated notch 23 and immediately, the bent portion 34 of the resilient leaf spring 3 will automatically obstruct at the terminal face of the pawl 14 retaining the pawl 14 away from that particular notch. Unless the edge 24 of another open notch is first employed to push the bent portion 34 of the resilient leaf spring 3 away from the terminal face of the pawl 14, then only will the pawl 14 fall into any of the notch 23. Hence, the resilient leaf spring 3 serves effectively in the control of the locking as well as unlocking of the locking piece in the joint mechanism of the present invention.

I claim:

1. A safety joint mechanism for folding ladders, comprising:
    a first joint member including
        a disk-shaped portion comprising a pair of spaced apart, symmetrically disposed circular plates,
        a tubular portion extending from said disk-shaped portion and including a pair of opposing, spaced apart sides in each of which is formed a rectangular slot,
        a pawl slidably supported in said slots, spring means for biasing said pawl in a first direction,
        a pivotable operating lever including a manually actuable handle portion and a pawl-actuating fork-shaped portion engageable with said pawl when said handle portion is actuated, for pushing said pawl opposite said first direction against the bias of said spring, and
        a resilient leaf spring mounted on a rivet in said pair of sides of said tubular portion at a location between said slots and said handle portion and including a bent portion in the form of a lug being pressed closely against the side face of said pawl when the latter is in engagement with a notch and snap-engaging the terminal face of said pawl when the latter is being disengaged from such notch by said pawl-actuating portion,
    a second joint member mounted to said first joint member for relative rotation about an axis of rotation, said second joint member comprising
        a hollow flat locking disk element including a plurality of circumferentially spaced notches on its outer periphery,
        said disk element disposed between said circular plates and being connected thereto by a pivot pin defining said axis of rotation, said pivot pin extending centrally through said disk element and said circular plates such that relative rotation between said disk element and said circular plates sequentially orients said pawl in alignment with said notches, and
        a tubular portion extending from said disk element.

2. A joint mechanism according to claim 1, wherein said resilient leaf spring comprises a plate having one end, the tail end, rolled up in the form of a cylinder and the other end, the free end, carrying said bent portion.

3. A joint mechanism according to claim 2 characterized in that said resilient leaf spring is retained on its outer side by a retaining pin passing through said pair of sides of the tubular portion of said first joint member.

* * * * *